United States Patent [19]
Graham

[11] 4,108,481
[45] Aug. 22, 1978

[54] GASKETED PIPE JOINT

[75] Inventor: Robert Malcolm Graham, Birmingham, Ala.

[73] Assignee: United States Pipe and Foundry Company, Birmingham, Ala.

[21] Appl. No.: 747,846

[22] Filed: Dec. 6, 1976

[51] Int. Cl.² ............................................. F16L 21/04
[52] U.S. Cl. ................................... 285/231; 285/345; 285/379
[58] Field of Search ............... 285/369, 230, 231, 345, 285/110, 374, 379; 277/207 A

[56] References Cited
U.S. PATENT DOCUMENTS

| 2,245,154 | 6/1941 | McWane ......................... 277/207 A |
| 2,953,398 | 9/1960 | Haugen et al. .................. 285/321 X |

FOREIGN PATENT DOCUMENTS

| 799,313 | 6/1936 | France ................................. 277/207 A |
| 10,898 | 2/1956 | Fed. Rep. of Germany ........... 285/231 |
| 1,221,505 | 7/1966 | Fed. Rep. of Germany ........... 285/369 |
| 594,975 | 6/1959 | Italy ......................................... 285/231 |
| 36,644 | 9/1935 | Netherlands ............................. 285/345 |

Primary Examiner—Dave W. Arola
Attorney, Agent, or Firm—James W. Grace

[57] ABSTRACT

Bell and plain or beveled end pipe sections are joined together in sealing engagement by placing a gasket between the sections and in radial compression. Pipe whose cross sections may deviate from a true circle and whose diameters may range over a wide tolerance are joined together utilizing an economical gasket, without requiring extremely high assembly forces. A specific portion of the gasket is compressed by a novel compression rib which allows assembly of the system without excessive end force and yet maintains radial compression of the gasket over a wide range of tolerances.

4 Claims, 7 Drawing Figures

4,108,481

GASKETED PIPE JOINT

BACKGROUND OF THE INVENTION

This invention is in the field of joining pressure pipe, more specifically, those with a bell on one end and the other end plain.

Cast iron pressure pipe, with a bell on one end and the other plain or beveled, have for many years been joined utilizing a rubber gasket which is compressed between the walls of the bell and the outside wall of the plain or beveled end. The most successful of such systems provide an elongated groove in the bell with a gasket sealing wall and a gasket restraining portion as well as lip and wall portions which guide and limit travel of the plain end as it passes through the bell opening and the rubber gasket is compressed. Such a pipe joint is described in U.S. Pat. No. 2,953,398 issued Sept. 20, 1960. The rubber gaskets used as a part of such systems have a retainer part and a sealing part. While there may be added lip seals or various additions to the gasket, the essential portions are merely a portion which will cause the gasket to remain in its proper position during joint assembly and use and a portion which will maintain sealing engagement with the two pipe sections at all times. Small diameter cast iron pipe are readily sealed by such a system since their cross section deviates only slightly from a true circle and since they are cast to relatively close tolerances. When larger pipe are produced and the pipe wall thickness is increased only a small amount, several problems of major proportion become apparent. These problems include the occurrence of oval cross sections and the need for greater casting tolerances. Many solutions to these problems have been devised with varying degrees of success due mainly to the economics of the solution. In general, the gasket utilized in such joining systems must fill the space between the bell inside sealing wall and the outside wall of the plain end and remain compressed to some degree regardless of ovalness or tolerance. In the design of such systems when sizing the cross section of the gasket and determining its maximum and minimum tolerances to be allowed, two extreme conditions must be considered. One condition is when the gasket is under minimum compression, e.g., when the space to be filled for the maximum size bell and the minimum size plain end, the plain end resting in the invert of the bell and the ovalness of the two sections oriented so as to place the maximum gap at the upper extremity. The other condition is when the gasket is under maximum compression, e.g., when the bell cavity is minimum size and the plain end maximum size. The first condition is usually referred to as a loose joint and the second as a tight joint. If in pipe larger than about 24 inches in diameter, a bell and a gasket of reasonable size are provided such that the gasket will fill the gap occurring in the loose joint and remain in radial compression, then when a tight joint condition is encountered the assembly force required is quite unreasonable. Conversely, if a small enough gasket is provided to keep the assembly force within reasonable limits, the gap occurring between the two sections of a loose joint will not be filled and a leak will occur. Solutions to this problem include reducing the tolerances to such an extent that machining or grinding the joining surfaces is necessary to achieve the tolerances, marking the major axis and laying each pipe with the major axis of the plain end in a vertical position, providing jacks to force the pipe into a circular cross section when joining, perforating a portion of the sealing bulb on the gasket to allow it to compress more readily and various additions to the gasket, such as lip seals. All of these solutions add substantially to the cost of the product. It should be noted that when relatively flexible pipe, such as ANSI A 21.51 Class 50 thirty-six inch diameter ductile iron pipe, are being joined, the "loose joint" condition will allow a gap which is much greater than that which would be expected from the two oval sections being joined as described above. Field tests have revealed that under certain external loading the circumference of the plain end tends to conform to the inside circumference of the bell lip for a large portion thereof, creating an extremely large gap at the upper extremity.

SUMMARY OF THE INVENTION

The present invention provides a compression rib in the bell gasket sealing wall at such a location as to engage and compress the sealing part of the gasket. This rib, because of its size, shape and position, will remain in sealing engagement with the gasket and keep the gasket forced into sealing engagement with the outside wall of the plain end without requiring an unusually high end force to assemble the joint.

It is thus an object of this invention to provide a pipe joining system which will seal bell and plain end pipe of widely varying dimensional tolerances without requiring unreasonably high end forces.

It is also an object of this invention to provide a joining system capable of sealing bell and plain end pipe of widely varying dimensional tolerances utilizing a small economical gasket.

It is a further object of this invention to provide a pipe joining system which will permit sealing of bell and plain end pipe whose cross section deviates from a true circle.

DESCRIPTION OF THE PREFERRED EMBODIMENT

Figure 1:
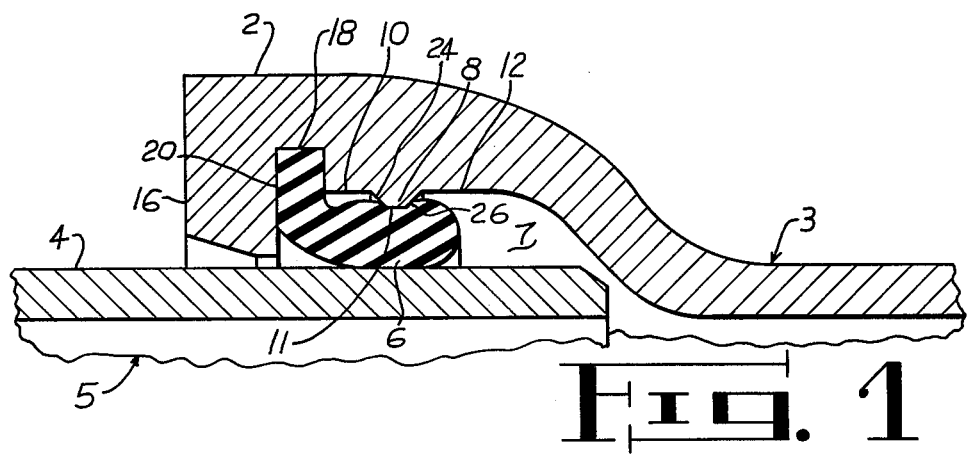
FIG. 1 is a fragmented cross section of the preferred embodiment.

In the preferred embodiment illustrated in FIG. 1, there is shown a joint formed between a pipe bell 2 of one pipe 3 into which plain end 4 of another pipe 5 has been placed with gasket 6 compressed therebetween. Plain end 4 is a generally round end portion of pipe 5 which fits into the bell end of pipe 3. Bell end 2 has an elongated groove 7 bounded generally by inner wall 20, retainer portion 18, front sealing wall 10, compression rib 8 and rear sealing wall 12. Retainer portion 18 prevents gasket 6 from being dislodged during assembly or when the joint is under pressure. Compression rib 8 depends radially inwardly between front sealing wall 10 and rear sealing wall 12. Gasket 6 is located in groove 7 in sealing engagement with plain end 4 and compression rib 8. It can readily be seen that in a tight joint condition gasket 6 will also be compressed into sealing engagement with plain end 4 and compression rib 8 as well as forward gasket sealing wall 10 and rear gasket sealing wall 12. This tight condition also will occur over part of the circumference where oval bell or plain end sections are joined. However, in such cases, the loose condition may also occur over part of the circumference. The compression rib 8 of the present invention provides means of compressing gasket 6 under both tight conditions and loose joint conditions. In both cases, sealing part thickness $y$ of gasket 6 (shown in FIG. 4), is reduced causing gasket 6 to be extruded both axially and circumferentially.

When the pipe joint is placed under pressure, i.e., the pipe line is pressurized, gasket 6 will be forced toward the bell lip 16 and will fill the cavity formed by the compression rib 8, forward gasket sealing wall 10, gasket restrainer groove 18, inner wall 20 and plain end 4. The gasket 6 may or may not seal against front and rear gasket sealing walls 10 and 12 and a seal against these portions of the bell is not necessary to have a leak-free system. It is also apparent that the gap between lip 16 and plain end 4 must be limited in dimension so as to prevent gasket 6 from being extruded there through when the system is pressurized. Since sealing of the system depends on compressing gasket 6 against compression rib 8 and plain end 4, the maximum and minimum dimension therebetween must have some relationship to the dimension $y$ of gasket 6.

Figure 2:
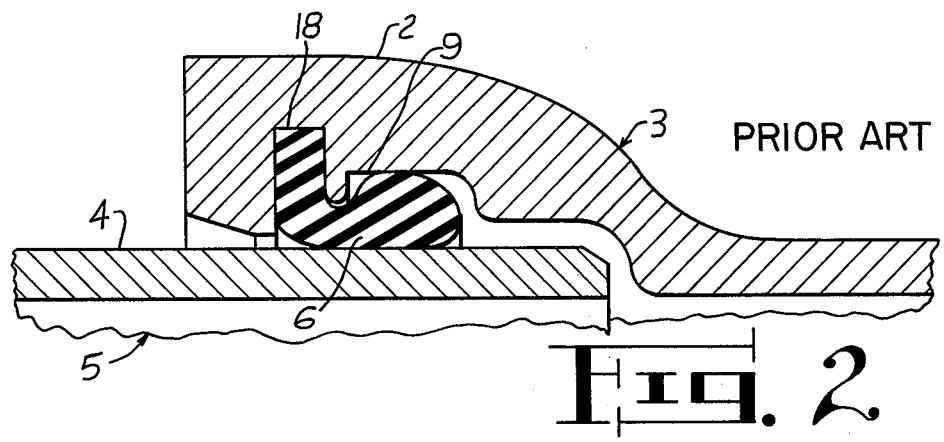
FIG. 2 is a fragmented cross section of a prior art pipe joint.
Figure 3:
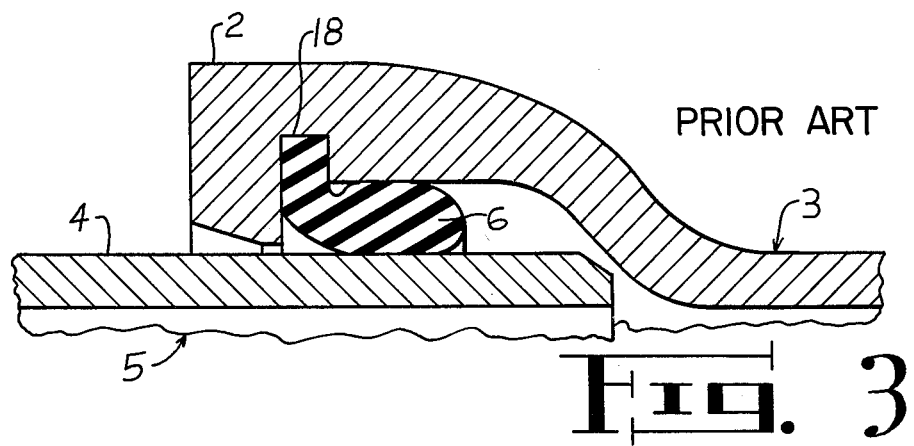
FIG. 3 is also a fragmented cross section of a prior art pipe joint.
Figure 4:
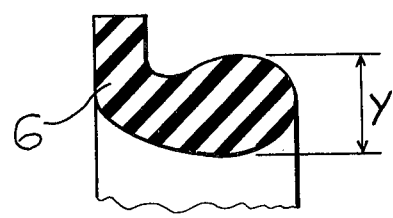
FIG. 4 is a cross section of the circular gasket of the preferred embodiment or the prior art pipe joints.
Figure 5:
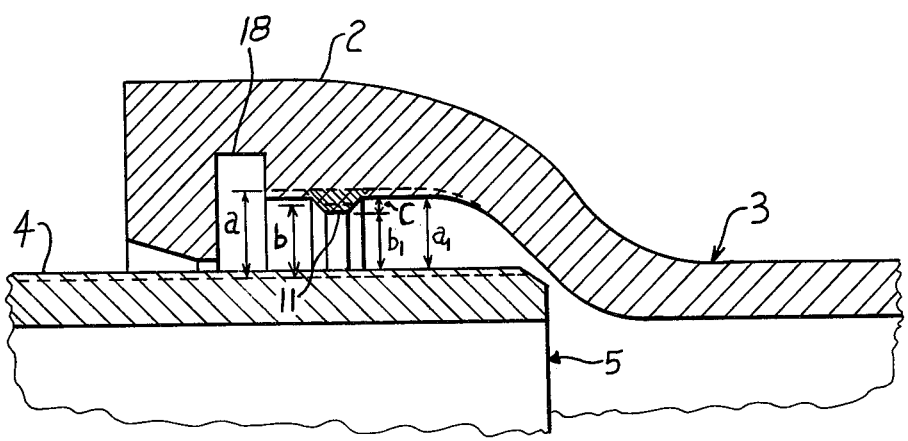
FIG. 5 is a fragmented cross section of a prior art pipe joint without the gasket but with the compression rib of the preferred embodiment added.
Figure 6:
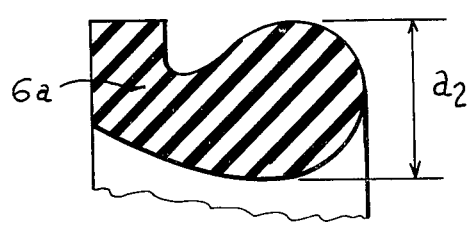
FIG. 6 is a cross section of a gasket.
Figure 7:
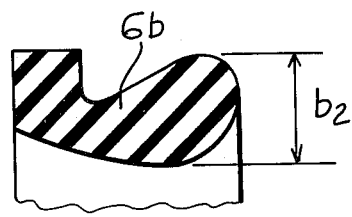
FIG. 7 is also a cross section of a gasket.

There is shown in FIG. 2 a well known prior art pipe joint wherein the maximum gap between the sealing surface 9 of bell 2 of pipe 3 and plain end 4 of pipe 5 must be slightly smaller than dimension $y$ of the gasket 6 shown in FIG. 4, thus reducing dimension $y$ of the gasket 6 about 3%, and the minimum gap should not cause the gasket 6 to be compressed so as to reduce dimension $y$ more than about 40%. Compressing the dimension $y$ by more than 40% requires an unreasonable end force not practicably attainable when laying pipe even with heavy equipment. Further, it endangers the gasket surfaces which could be cut by the plain end and also could cause the gasket 6 to be dislodged from the retainer groove 18. These limitations are thus practiced in joining systems wherein the gasket seals by radial compression between the members being joined. Another such well-known system is shown in FIG. 2. However, the present invention, by providing this same known joining system with the addition of a compression rib 8a (See FIG. 5), can seal against the same pressures while allowing a greater dimensional tolerance on the sealing surfaces, and/or accomplish this sealing with a smaller, more economical gasket. This may be better understood by referring to FIG. 5 which without the cross hatched compression rib 8a represents the bell surfaces and the plain end surfaces of a prior art pipe joint. Dimension $a$ is the maximum gap allowed between the sealing surfaces and the dimension $a_1$ is the minimum gap. Gasket 6a of FIG. 6 having a sealing part thickness $a_2$ is required to seal this joint. (The dotted lines represent the maximum gap to be sealed indicated by dimensions $a$ and $b$ while the solid lines represent the minimum gap to be sealed indicated by dimensions $a_1$ an $b_1$.) The dimension $a_2$ will be about 3% greater than $a$ and about 40% greater than $a_1$. By providing the cross hatched compression rib 8a and reducing the gasket size such that the sealing part thickness $b_2$ of gasket 6b (FIG. 7) is about 3% greater than dimension $b$ which represents the maximum gap allowed between the inner surface 11 of compression rib 8a and plain end 4, it is possible to allow the minimum dimension $b_1$ between inner surface 11 of compression rib 8a and plain end 4 to compress the thickness of the gasket 6b (dimension $b_2$) by as much as about 70% and not substantially affect the end force required to assemble the pipe sections. Further, the maximum allowable variation between dimension $b$ and dimension $b_1$ can be much greater than the maximum allowance between dimension $a$ and dimension $a_1$ since the thickness of gasket 6b (dimension $b_2$) has been compressed by as much as 70%. It should also be noted that one might choose to use the compression rib to achieve any one of the beneficial results possible, i.e., to reduce the end force required to assemble the pipe sections being joined, to allow use of a smaller more economical gasket or to allow wider tolerances on the sealing surfaces.

Compression rib 8 should for best results be located in groove 7 such that gasket 6 will remain with its sealing part thickness on inner surface 11 of rib 8 when the system is under maximum or minimum pressure. Since the sealing portion of gasket 6 of FIG. 1 will move under internal pipe pressure toward inner wall 20, compression rib 8 will preferably have a flat face at its inner surface 11. While other shapes such as oval, semicircular or even angular would be workable, it is preferred that inner surface 11 be cylindrical and parallel to the axis of the pipe. Such a shape will be more easily gaged and should be easily cast without defects. Inclined shoulders 24 and 26 are provided forming obtuse angles with front and rear sealing walls 10 and 12, respectively. The height of compression rib 8 represented by dimension $c$ shown in FIG. 5 can vary to some degree and such height must be selected to suit the design and tolerances desired. For example, in sealing cast iron pipe with a nominal diameter of 36 inches where the variations in the dimensions $b$ and $b_1$ have been selected to be as much as 0.56 inch and gasket 6 has a maximum sealing part dimension $b_2$ of 0.88 inch, the height selected for the compression rib is 0.15 inch. Such a system would compress gasket 6 as much as 71% and as little as 3% provided the dimensions were within the tolerances selected.

The above example is for illustration only. It will be apparent to those of ordinary skill in the art that the same gasket sealing part dimension (0.88 inch) could be used to seal the prior art joint if $a$ and $a_1$ were allowed to vary by 0.56 inch also. However, in such a system the entire gasket sealing part must be compressed requiring an unreasonable end force for assembly and subjecting the gasket to the hazard of being damaged or dislodged. It should thus also be apparent that the width of face 11 of the compression rib should be very narrow. While the width of face 11 can vary, it is preferably not more than twice the height of the compression rib. Of course, as has been previously stated, the compression rib could be of such shape as not to have a flat face at all.

The present embodiments of this invention are to be considered in all respects as illustrative and not restrictive, the scope of the invention being indicated by the appended claims.

I claim:
1. The combination with a pipe joint including:
   a. an inner pipe with a plain end telescoped into the open end of an outer pipe, b. said outer pipe having an axially elongated groove extending radially around its inside surface near said open end,
c. said axially elongated groove having gasket retaining means and a sealing wall,
d. said inner pipe having a plain end with an outside sealing wall,
e. a resilient gasket in said elongated groove,
f. said resilient gasket having a retaining portion cooperating with said retaining means to prevent said gasket from being dislodged from said joint and a sealing portion, said sealing portion having an outer surface,
g. the improvement which comprises an integral compression rib located between a forward gasket sealing wall and rear gasket sealing wall of said outer pipe and having a sealing face, said rib protruding radially inwardly into said axially elongated groove, said rib being so positioned that the thickest part of said sealing portion of said gasket contacts said rib and a portion of said outer surface of said sealing portion of said gasket does not contact said forward gasket sealing wall whereby said sealing portion of said resilient gasket is radially compressed between said compression rib and said outside sealing wall of said inner pipe.

2. The pipe joint of claim 1 wherein the surface of said compression rib most remote from the forward and rear gasket sealing walls is cylindrical.

3. The pipe joint of claim 1 wherein the surface of said compression rib most remote from the forward and rear gasket sealing walls is oval.

4. The pipe joint of claim 2 wherein the width of the sealing face of said compression rib is not more than twice the height of said rib.

* * * * *